US012683215B2

(12) United States Patent
Park et al.

(10) Patent No.: US 12,683,215 B2
(45) Date of Patent: Jul. 14, 2026

(54) BATTERY MODULE AND BATTERY PACK INCLUDING THE SAME

(71) Applicant: LG ENERGY SOLUTION, LTD., Seoul (KR)

(72) Inventors: Subin Park, Daejeon (KR); Junyeob Seong, Daejeon (KR); Junkyu Park, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 615 days.

(21) Appl. No.: 17/926,947

(22) PCT Filed: Apr. 8, 2021

(86) PCT No.: PCT/KR2021/004395
§ 371 (c)(1),
(2) Date: Nov. 21, 2022

(87) PCT Pub. No.: WO2021/246636
PCT Pub. Date: Dec. 9, 2021

(65) Prior Publication Data
US 2023/0198046 A1 Jun. 22, 2023

(30) Foreign Application Priority Data

Jun. 4, 2020 (KR) ........................ 10-2020-0067764

(51) Int. Cl.
| *H01M 10/653* | (2014.01) |
|---|---|
| *H01M 10/613* | (2014.01) |
| *H01M 10/6556* | (2014.01) |
| *H01M 50/211* | (2021.01) |

(52) U.S. Cl.
CPC ....... *H01M 10/653* (2015.04); *H01M 10/613* (2015.04); *H01M 10/6556* (2015.04); *H01M 50/211* (2021.01)

(58) Field of Classification Search
CPC ............. H01M 10/653; H01M 10/613; H01M 10/6556; H01M 50/211; H01M 10/6567; H01M 10/6551; H01M 10/647; H01M 10/617; Y02E 60/10
See application file for complete search history.

(56) References Cited

U.S. PATENT DOCUMENTS

| 2011/0059347 | A1 | 3/2011 | Lee et al. |
|---|---|---|---|
| 2012/0156543 | A1 | 6/2012 | Cicero et al. |
| 2018/0076493 | A1 | 3/2018 | Park et al. |
| 2019/0131596 | A1 | 5/2019 | Yang et al. |
| 2019/0229364 | A1 | 7/2019 | Sakamoto et al. |
| 2019/0280355 | A1 | 9/2019 | Kim et al. |
| 2020/0006823 | A1* | 1/2020 | Chung ............... H01M 10/655 |
| 2020/0006825 | A1* | 1/2020 | Lee ..................... H01M 50/271 |
| 2020/0067155 | A1 | 2/2020 | Hwang et al. |
| 2020/0185797 | A1 | 6/2020 | Park et al. |
| 2020/0313253 | A1 | 10/2020 | Ahn |
| 2020/0388891 | A1* | 12/2020 | Choi ................... H01M 10/647 |
| 2020/0411924 | A1* | 12/2020 | Yun ..................... H01M 50/298 |
| 2021/0167441 | A1* | 6/2021 | You ..................... H01M 50/249 |
| 2021/0184289 | A1 | 6/2021 | Jeong et al. |
| 2022/0247004 | A1 | 8/2022 | Yun |
| 2023/0327231 | A1 | 10/2023 | Park et al. |

FOREIGN PATENT DOCUMENTS

| EP | 4181275 | | 5/2023 |
|---|---|---|---|
| JP | 2010-113961 | A | 5/2010 |
| JP | 2014504440 | | 2/2014 |
| KR | 10-2010-0109872 | A | 10/2010 |
| KR | 10-2016-0024187 | A | 3/2016 |
| KR | 1020160041257 | A | 4/2016 |
| KR | 10-2016-0105354 | A | 9/2016 |
| KR | 10-2017-0019041 | A | 2/2017 |
| KR | 10-2019-0054805 | A | 5/2019 |
| KR | 10-2019-0092835 | A | 8/2019 |
| KR | 10-2019-0095047 | A | 8/2019 |
| KR | 10-2019-0106715 | A | 9/2019 |
| KR | 10-2020-0001692 | A | 1/2020 |
| KR | 10-2020-0004202 | A | 1/2020 |
| KR | 10-2020-0021608 | A | 3/2020 |
| WO | 2019177275 | | 9/2019 |

* cited by examiner

*Primary Examiner* — Muhammad S Siddiquee
(74) *Attorney, Agent, or Firm* — BRYAN CAVE LEIGHTON PAISNER LLP

(57) ABSTRACT

A battery module including: a battery cell stack including a plurality of battery cells; a housing for the battery cell stack; and a thermal conductive layer disposed on the battery cell stack. The thermal conductive layer includes a first thermal conductive layer and a second thermal conductive layer disposed at respective ends of electrode leads of the battery cell in a direction protruding from an upper surface of the battery cell stack.

11 Claims, 7 Drawing Sheets

【Figure 1】
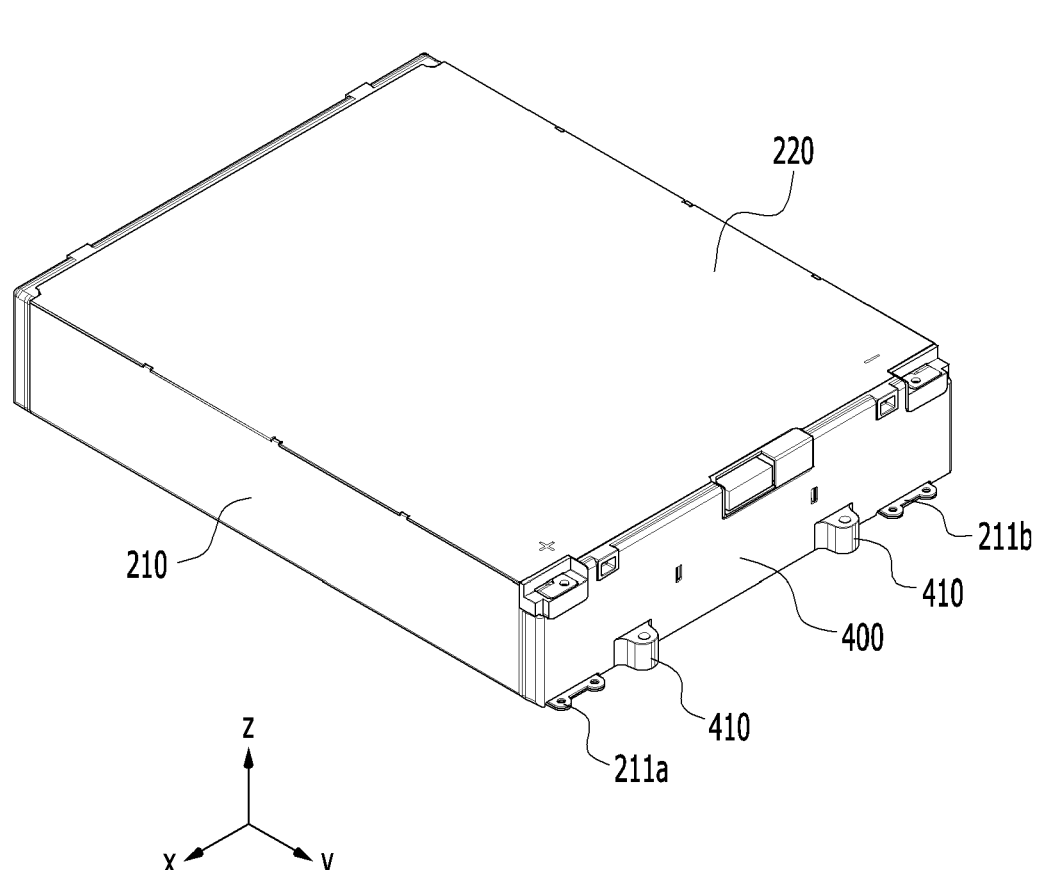

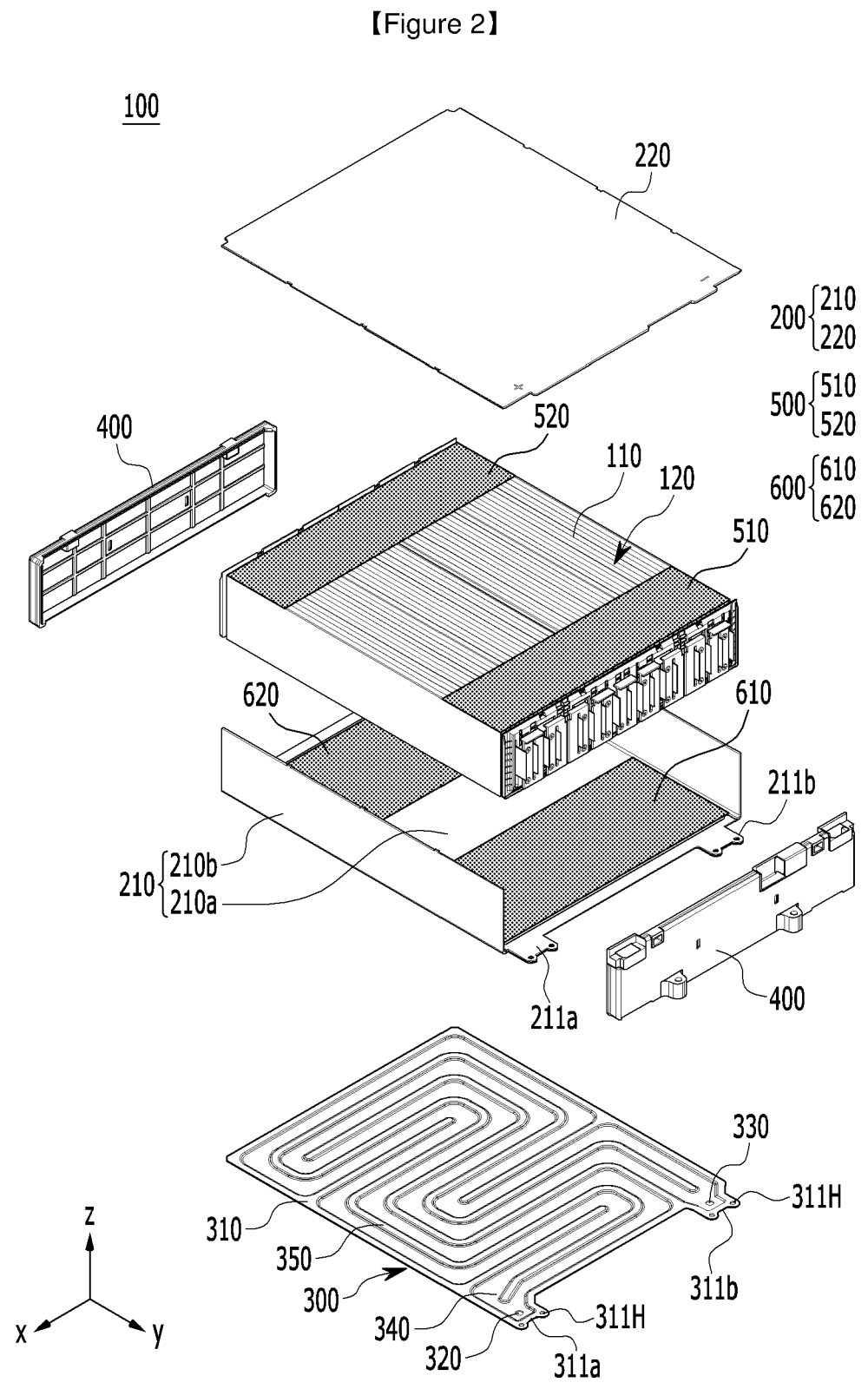

【Figure 2】

【Figure 3】
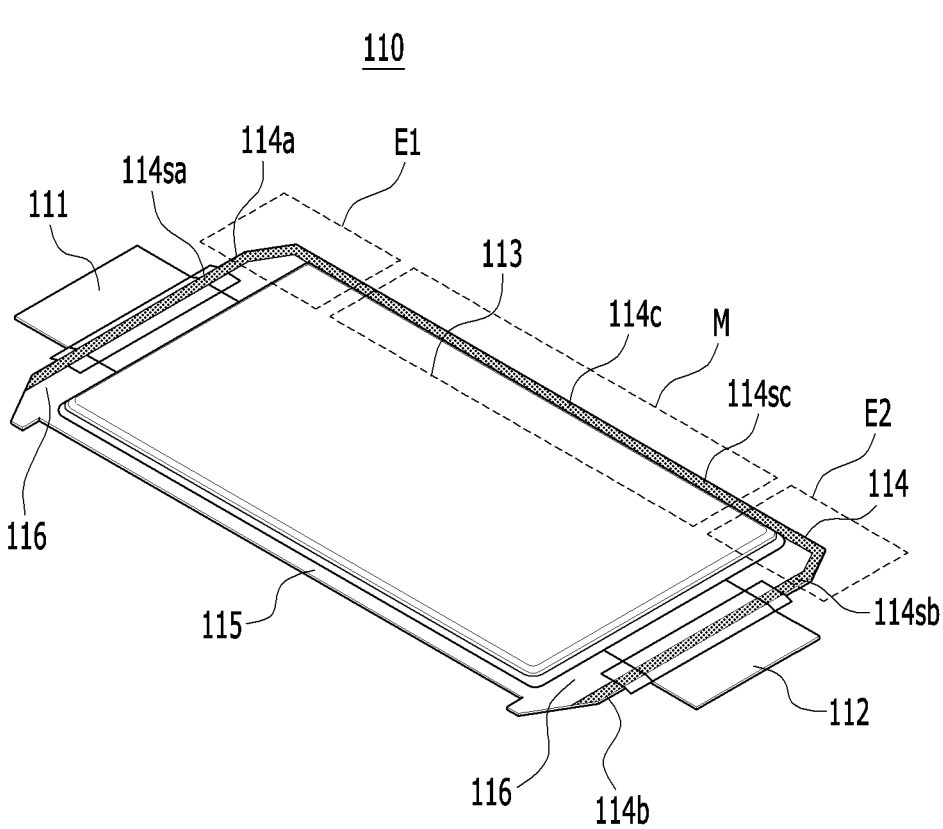

【Figure 4】
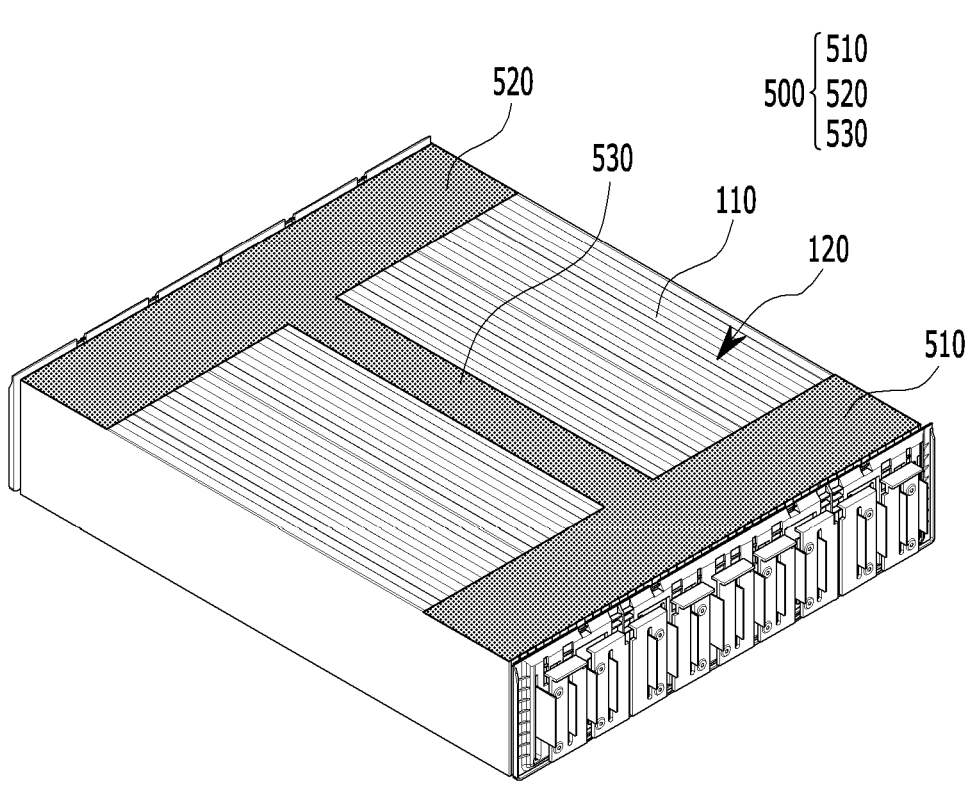

【Figure 5】
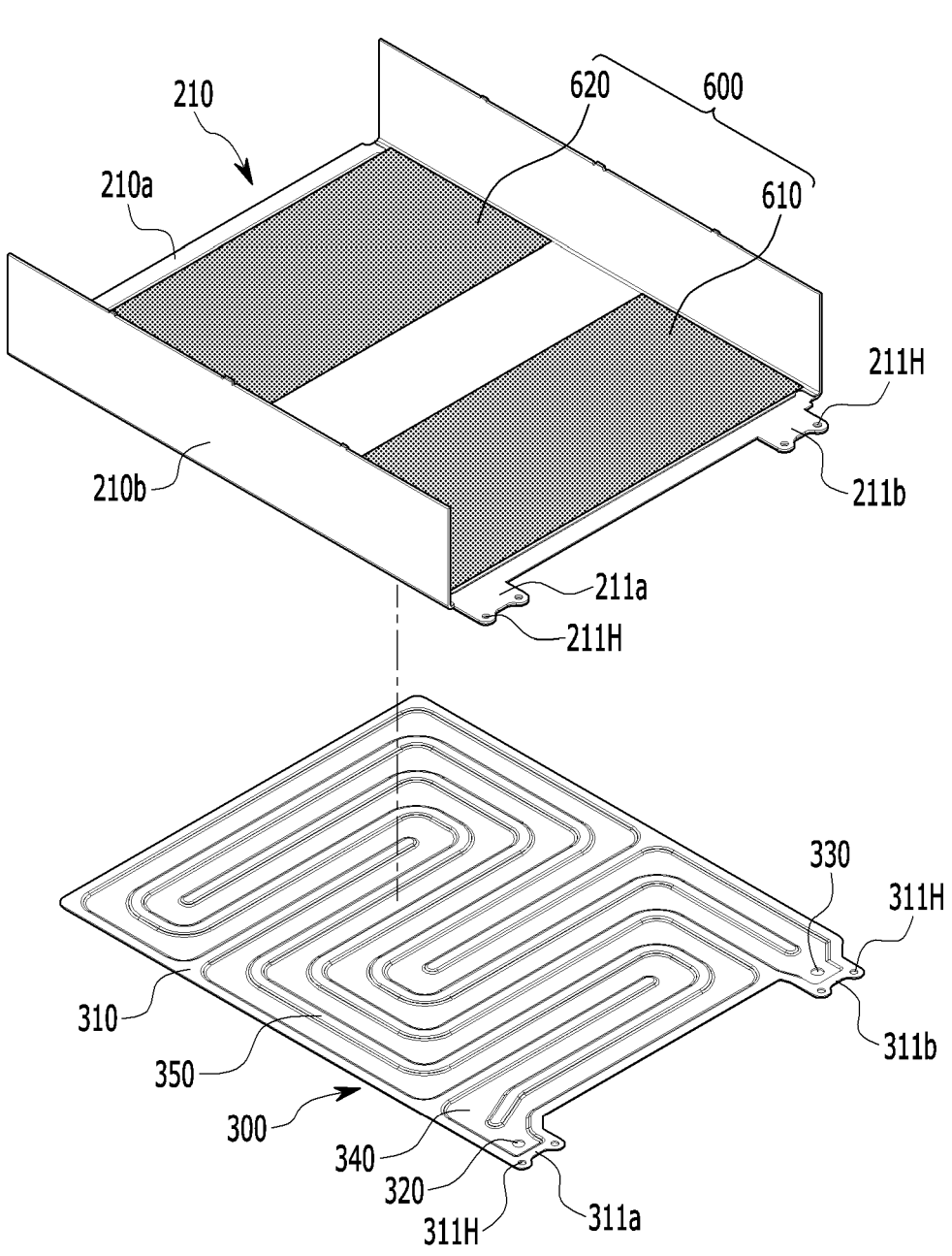

【Figure 6】
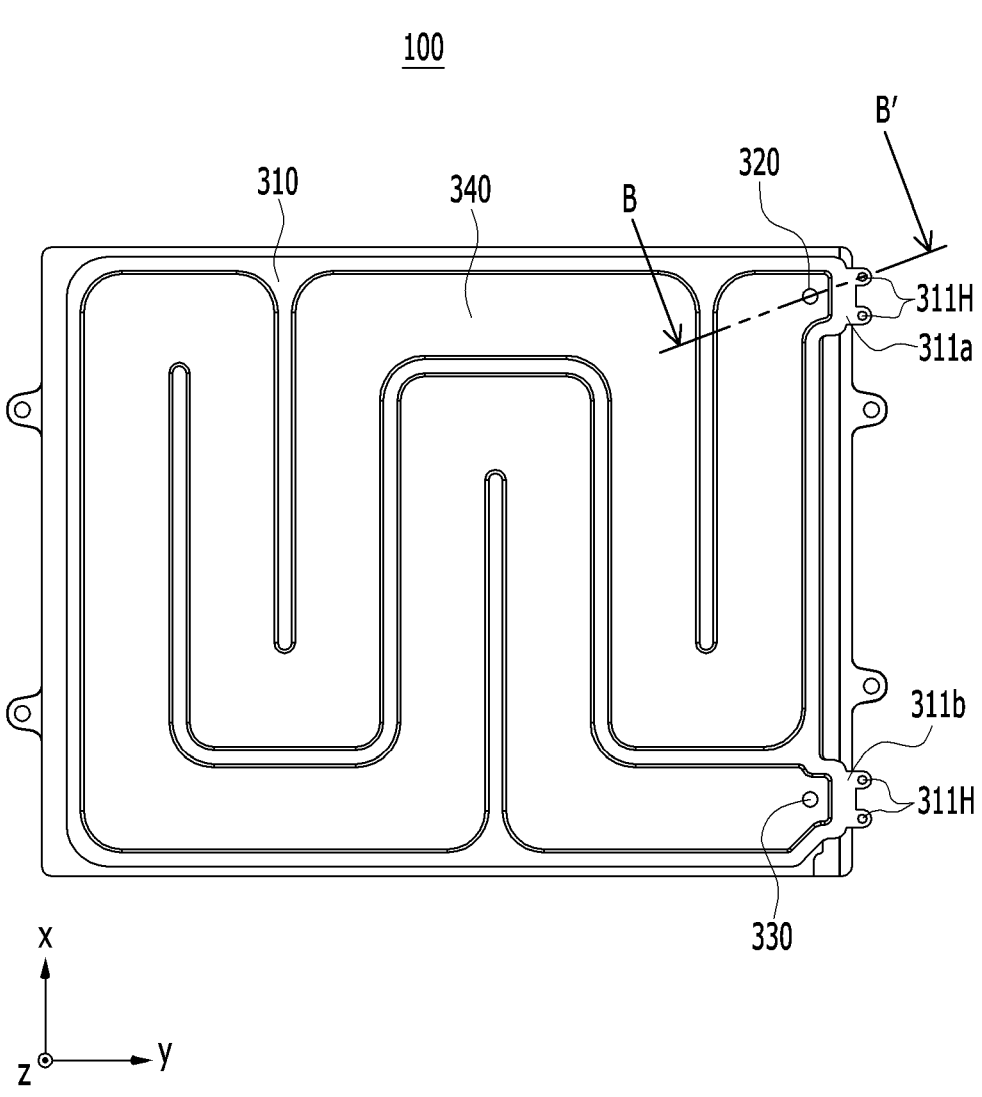

【Figure 7】
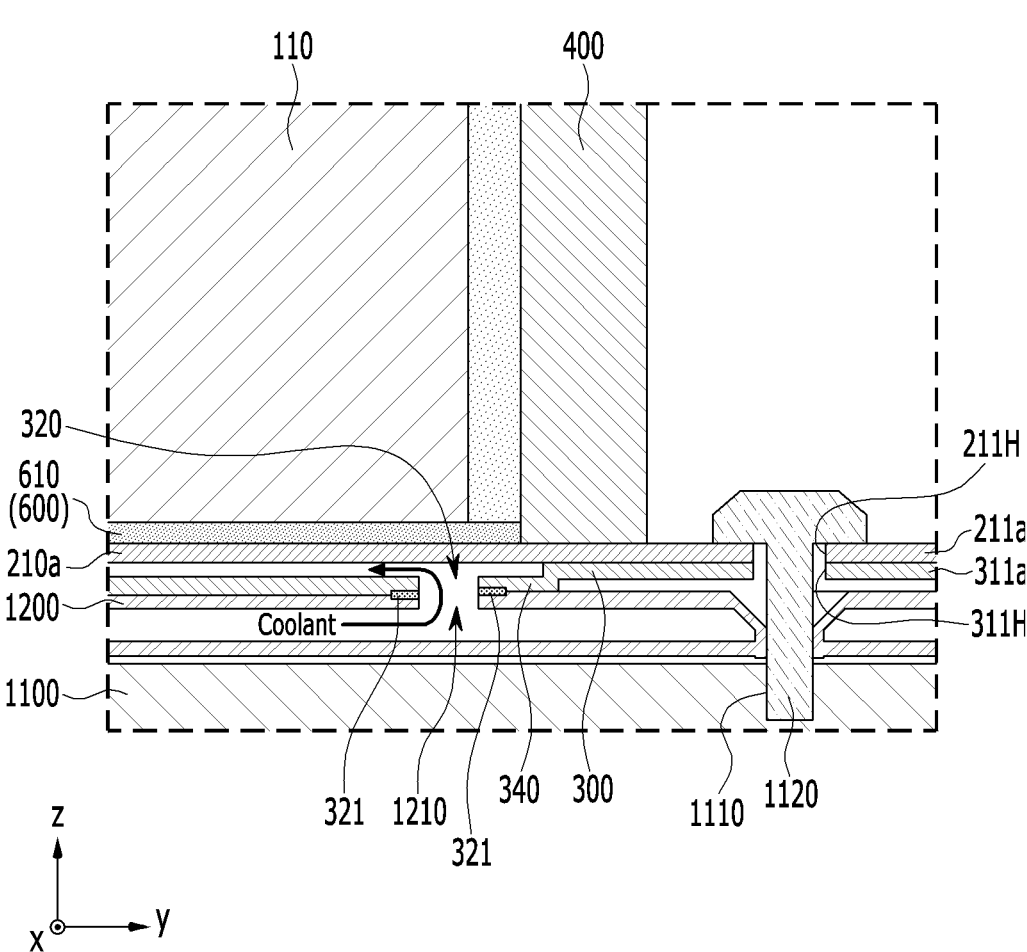

BATTERY MODULE AND BATTERY PACK INCLUDING THE SAME

CROSS-REFERENCE TO RELATED APPLICATIONS

This application is a US national phase of international Application No. PCT/KR2021/004395 filed on Apr. 8, 2021, and claims priority to and the benefit of Korean Patent Application No. 10-2020-0067764 filed on Jun. 4, 2020, the entire contents of which are incorporated by reference as if fully set forth herein.

TECHNICAL FIELD

The present invention relates to a battery module and a battery pack including the same, and particularly relates to a battery module for increasing cooling performance and a battery pack including the same.

BACKGROUND

In modern society, as use of portable devices such as mobile phones, laptops, camcorders, or digital cameras is becoming a daily routine, developments in the field relating to the above-noted mobile devices are becoming active. Further, secondary batteries that may be repeatedly charged and discharged are measures for solving air pollution generated by existing gasoline vehicles that use fossil fuels, and are used as power sources of electric vehicles (EV), hybrid electric vehicles (HEV), or plug-in hybrid electric vehicles (P-HEV), and necessity of developing the secondary batteries is increasing.

The commercially available secondary batteries are nickel cadmium batteries, nickel hydrogen batteries, nickel zinc batteries, and lithium secondary batteries, and among them, the lithium secondary batteries seldom generate a memory effect, compared to nickel-based secondary batteries, so they are freely charged and discharged, they have very low self-discharging rates, and they have high energy density as merits.

The lithium secondary batteries generally use lithium-based oxides and carbon materials as positive active materials and negative active materials, respectively. The lithium secondary battery includes an electrode assembly in which a positive electrode plate and a negative electrode plate on which the positive active material and the negative active material are applied, respectively, are disposed with a separator therebetween, and a battery case for sealing and receiving the electrode assembly together with an electrolyte solution.

In general, the lithium secondary battery may be classified as a cylindrical or can-type secondary battery when the electrode assembly is installed in a metal can, and a pouch-type secondary battery when the electrode assembly is installed in a pouch of an aluminum laminate sheet, depending on a shape of the exterior material.

Two or three battery cells are disposed in secondary batteries used in small devices, and battery modules in which a plurality of battery cells are electrically connected are used in secondary batteries for medium to large devices such as vehicles. The battery modules increase capacity and output as a plurality of battery cells are coupled in series or in parallel and form a battery cell stack. At least one battery module may be installed with various types of controlling and protecting systems such as a battery management system (BMS) or a cooling system to configure a battery pack.

When the temperature of the secondary battery becomes higher than an appropriate temperature, performance of the secondary battery may deteriorate, and the secondary battery may explode or ignite in a worst case scenario. Particularly, for a plurality of secondary batteries, heat generated by a plurality of battery cells in a narrow space may accumulate, and the temperature may increase more quickly and steeply. In other words, the battery module in which a plurality of battery cells are stacked and the battery pack in which the battery module is installed may obtain high output, and it is not easy to remove the heat generated by the battery cell when being charged and discharged. When the battery cell fails to normally radiate heat, the battery cell may quickly deteriorate, its cycle-life is reduced, and the possibility of its explosion or ignition increases.

The battery module included in the battery pack for the vehicle may be frequently exposed to direct sunlight and may fall into a high temperature condition such as summertime or in desert areas.

In addition, a plurality of battery cells are compactly stacked to configure a battery module, so the battery cell positioned on the outermost side is further influenced by external environments. Temperature deviations among the battery cells may increase. Non-uniformity of temperatures among the battery cells may become a factor in reducing a lifespan of the battery module.

Therefore, when the battery module or the battery pack is configured, it may be very important to obtain efficient cooling performance and reduce temperature deviation among the battery cells.

SUMMARY

The present invention has been made in an effort to provide a battery module that increases cooling performance and minimizes temperature deviation among battery cells and a battery pack including the same.

However, the objective of the present invention is not limited to the aforementioned one, and may be extended in various ways within the spirit and scope of the present invention.

An exemplary embodiment of the present invention provides a battery module including: a battery cell stack in which a plurality of battery cells are stacked; a housing for receiving the battery cell stack; and a thermal conductive layer disposed on the battery cell stack, wherein the thermal conductive layer includes a first thermal conductive layer and a second thermal conductive layer disposed at respective ends of an upper side of the battery cell stack in a protruding direction of electrode leads of the battery cell.

The first thermal conductive layer and the second thermal conductive layer may be connected in a direction in which the battery cells are stacked.

The thermal conductive layer may include a third thermal conductive layer disposed between the first thermal conductive layer and the second thermal conductive layer.

The third thermal conductive layer may be connected to the first thermal conductive layer and the second thermal conductive layer.

The third thermal conductive layer may be connected to one side of a cell body of the battery cell in a parallel direction.

The third thermal conductive layer may be spaced from a battery cell disposed on an outermost side of the battery cell stack.

The battery module may further include a thermal resin layer disposed between the battery cell stack and a bottom part of the housing.

The thermal resin layer may include a first thermal resin layer and a second thermal resin layer spaced from each other, and the first thermal resin layer and the second thermal resin layer may be disposed at respective ends of the bottom part in a protruding direction of electrode leads of the battery cell.

The battery module may further include a heat sink disposed below a bottom part of the housing, wherein the bottom part forms an upper plate of the heat sink.

The heat sink and the bottom part may form a flow path of a coolant, and the bottom part may contact the coolant.

According to the exemplary embodiments of the present invention, the thermal conductive layer is formed on the portion of the battery cell where much heat is generated, thereby increasing the cooling performance and minimizing the temperature deviation among the battery cells.

The cooling performance may be increased according to the structure in which the housing and the heat sink are integrated into a single body.

The cost may be reduced by removing unnecessary cooling structures, and the spatial utility may be increased, thereby increasing the capacity or the output of the battery module.

The effects of the present invention are not limited to the effects mentioned above, and other effects not mentioned can be clearly understood by those skilled in the art from the description of the claims.

BRIEF DESCRIPTION OF THE DRAWINGS

FIG. 1 is a perspective view of a battery module according to an exemplary embodiment of the present invention.

FIG. 2 is an exploded perspective view of the battery module of FIG. 1.

FIG. 3 is a perspective view of a battery cell included in the battery module of FIG. 2.

FIG. 4 is a perspective view of a battery cell stack and a thermal conductive layer according to another exemplary embodiment of the present invention.

FIG. 5 is a perspective view of a U-shaped frame and a heat sink included in the battery module of FIG. 2.

FIG. 6 is a top plan view of the battery module of FIG. 1 in a z-axis direction on an xy-plane.

FIG. 7 is a cross-sectional view along line B-B' of FIG. 6.

DETAILED DESCRIPTION

The present invention will be described more fully hereinafter with reference to the accompanying drawings, in which embodiments of the invention are shown. As those skilled in the art would realize, the described embodiments may be modified in various different ways, all without departing from the spirit or scope of the present disclosure.

Parts that are irrelevant to the description will be omitted to clearly describe the present invention, and the same elements will be designated by the same reference numerals throughout the specification.

Parts that are irrelevant to the description are omitted to clearly describe the present disclosure, and like reference numerals designate like elements throughout the specification. In the drawings, the thickness of layers, films, panels, regions, etc., are enlarged for clarity. For ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means disposed on or below the object portion, and does not necessarily mean disposed on the upper side of the object portion based on a gravitational direction.

Unless explicitly described to the contrary, the word "comprise" and variations such as "comprises" or "comprising" will be understood to imply the inclusion of stated elements but not the exclusion of any other elements.

The phrase "in a plan view" means viewing a target portion from the top, and the phrase "in a cross-sectional view" means viewing a cross-section formed by vertically cutting a target portion from the side.

FIG. 1 is a perspective view of a battery module according to an exemplary embodiment of the present invention. FIG. 2 is an exploded perspective view of the battery module of FIG. 1. FIG. 3 is a perspective view of a battery cell included in the battery module of FIG. 2.

As illustrated in FIG. 1 to FIG. 3, the battery module 100 includes a battery cell stack 120 in which a plurality of battery cells 110 are stacked, a housing 200 for receiving the battery cell stack 120, and a thermal conductive layer 500 positioned on the battery cell stack. The thermal conductive layer 500 include a first thermal conductive layer 510 and a second thermal conductive layer 520 positioned at respective ends of an upper side of the battery cell stack in a protruding direction of the electrode leads 111 and 112 of the battery cell 110.

The battery cell 110 is preferably a pouch-type battery cell, and may have a rectangular sheet-type structure. For example, the battery cell 110 has a structure in which two electrode leads 111 and 112 face each other and protrude from an end portion 114a and another end portion 114b, respectively, of the cell body 113. In detail, the electrode leads 111 and 112 are connected to an electrode assembly (not shown), and protrude to an outside of the battery cell 110 from the electrode assembly (not shown).

The battery cell 110 may be manufactured by attaching respective ends 114a and 114b of the cell case 114 and one side portion 114c for connecting them while the electrode assembly (not shown) is received in the cell case 114. In other words, the battery cell 110 has three sealing portions 114sa, 114sb, and 114sc, and the sealing portions 114sa, 114sb, and 114sc are sealed by a method such as thermal fusion, and another side portion may be formed with a connector 115. The cell case 114 may be made of a laminate sheet including a resin layer and a metal layer.

The connector 115 may extend along the length of one border of the battery cell 110. The cell case 114 is sealed with the protruding electrode leads 111 and 112 therebetween, and a terrace 116 may be formed between the electrode leads 111 and 112 and the cell body 113. That is, the battery cell 110 may include the terrace 116 extending from the cell case 114 in a direction in which the electrode leads 111 and 112 protrude.

When the battery cell 110 is repeatedly charged and discharged, the electrode leads 111 and 112 generate much heat. Particularly, from among the one side portion 114c of the battery cell 110 corresponding to the upper side of the battery cell stack 120, respective end portions E1 and E2 that are near the electrode leads 111 and 112 belong to regions that generate much heat from among the battery cell 110, and they have a significantly high temperature compared to a center portion (M) of the one side portion 114c.

In this instance, as described above, the first thermal conductive layer 510 and the second thermal conductive layer 520 are respectively positioned on the respective ends of the upper side of the battery cell stack 120 in the protruding direction of the electrode leads 111 and 112 of the battery cell 110. That is, the first thermal conductive layer 510 and the second thermal conductive layer 520 are positioned on the end portions E1 and E2, respectively, that are near the electrode leads 111 and 112 from among the one side portion 114c of the battery cell 110. Heat radiation and cooling performance may be increased by forming the thermal conductive layer 500 on the portion of the battery cell 110 where much heat is generated. The thermal conductive layer 500 may be formed by applying a heat-radiating adhesive. The heat-radiating adhesive may include a material with high thermal conductivity, and in detail, it may include polyurethane or silicon as a thermal resin.

A plurality of battery cells 110 may be included, and the plurality of battery cells 110 are stacked to be electrically connected to each other and form a battery cell stack 120. Particularly, as shown in FIG. 2, a plurality of battery cells 110 may be stacked in parallel to the x-axis.

The first thermal conductive layer 510 and the second thermal conductive layer 520 may connected in the direction in which the battery cells 110 are stacked. That is, the first thermal conductive layer 510 and the second thermal conductive layer 520 may be positioned on the end portions E1 and E2, respectively, of the battery cells 110 that are stacked in a constant direction.

The battery cell stack 120 according to the present embodiment may be a large area module that has a greater number of the battery cells 110 than the prior art. In detail, it may include 32 to 48 battery cells 110 for each battery module 100. In the case of the large area module, a length of the battery module in the horizontal direction increases. The horizontal direction length may represent the length in the direction in which the battery cells 110 are stacked, that is, the direction that is parallel to the x-axis.

The housing 200 receiving the battery cell stack 120 may include an upper cover 220 and a U-shaped frame 210. The thermal conductive layer 500 according to the present embodiment may be positioned between the battery cell stack 120 and the upper cover 220.

The U-shaped frame 210 may include a bottom part 210a and two lateral parts 210b extending upward from the respective ends of the bottom part 210a. The bottom part 210a may cover a bottom surface (an opposite direction of a z-axis) of the battery cell stack 120, and the lateral parts 210b may cover respective lateral surfaces (the x-axis direction and its opposite direction) of the battery cell stack 120.

The upper cover 220 may have a plate-shaped structure surrounding the upper surface (z-axis direction) excluding the bottom surface and the respective lateral surfaces surrounded by the U-shaped frame 210. The upper cover 220 may be combined to the U-shaped frame 210 by welding with edges corresponding to each other are in contact, to thus form a structure covering the battery cell stack 120 from top to bottom and from right to left. The battery cell stack 120 may be physically protected through the upper cover 220 and the U-shaped frame 210. For this purpose, the upper cover 220 and the U-shaped frame 210 may include metal materials with predetermined rigidity.

Although not shown, the housing 200 according to a variation may be a mono frame having a metal plate shape where an upper side, a bottom side, and respective lateral sides are integrated. That is, the U-shaped frame 210 and the upper cover 220 are not combined with each other, but may be manufactured by an extrusion molding method, and the upper side, the bottom side, and the respective lateral sides may be integrated.

The end plate 400 may be positioned on a front side (y-axis direction) and a rear side (the opposite direction of the y-axis) of the battery cell stack 120 and may cover the battery cell stack 120. The end plate 400 may physically protect the battery cell stack 120 and other electronic units from external impact.

Although not shown specifically, a bus bar frame in which a bus bar is installed and an insulating cover for electrical insulation may be positioned between the battery cell stack 120 and the end plate 400.

A third thermal conductive layer 530 according to another exemplary embodiment of the present invention will now be described with reference to FIG. 4.

FIG. 4 is a perspective view of a battery cell stack and a thermal conductive layer according to another embodiment of the present invention.

As illustrated in FIG. 4, the thermal conductive layer 500 may include a third thermal conductive layer 530 positioned between the first thermal conductive layer 510 and the second thermal conductive layer 520. The third thermal conductive layer 530 may be connected to the first thermal conductive layer 510 and the second thermal conductive layer 520, respectively, and may be connected to one side of the cell body 113 of the battery cell 110 in the parallel direction. That is, the third thermal conductive layer 530 may extend in the y-axis direction that is perpendicular to the direction in which the battery cells 110 are stacked. The third thermal conductive layer 530 may be spaced from the battery cells 110 that are positioned toward the outermost side of the battery cell stack 120, and it may be positioned at a center of the upper side of the battery cell stack 120.

As described above, the battery cell stack 120 according to the present embodiment may be a large-area module in which a greater number of battery cells 110 are provided than in the prior art. As the number of battery cells 110 increases, output capacity of the battery module may increase, but substantial deviation of temperatures between a battery cell 110 positioned on the outermost side and a battery cell 110 positioned on the innermost side may be generated. When the substantial deviation of temperatures between the battery cells 110 in the battery module 100 is maintained, this may be a factor that lowers the lifespan of the battery module.

By forming the third thermal conductive layer 530 according to the present embodiment, the deviation of temperatures between the battery cell 110 positioned on the outermost side and the battery cell 110 positioned on the innermost side may be reduced. It is generally difficult for the battery cell 110 positioned on the innermost side to radiate heat, but according to the present embodiment, the third thermal conductive layer 530 is included, so the battery cell 110 positioned on the innermost side may radiate heat to the outside of the battery module 100 through the third thermal conductive layer 530 and the upper cover 220.

As a comparative example of the present invention, a thermal conductive layer may be formed on an entire upper side of the battery cell stack 120. The thermal conductive layer is formed on the entire one side portion 114c of the battery cell 110, and it is difficult for the thermal conductive layer uniformly applied to the battery cells 110 having significantly varying degrees of heat radiation to reduce the deviation of temperatures among portions of the battery cell 110. Differing from this, the battery module 100 according to the present embodiment includes the first thermal conductive layer 510 and the second thermal conductive layer 520, so emission of heat may be efficiently performed at the respective end portions E1 and E2 where much heat is radiated from the battery cells 110, and the deviation of temperatures among respective portions for one battery cell 110 may be minimized.

The thermal conductive layer formed on the entire upper side of the battery cell stack 120 is uniformly provided on the upper side of the battery cell stack 120 as a comparative example, so it is difficult to solve the deviation of temperatures among the battery cells 110 of the battery cell stack 120. Differing from this, the battery module 100 according to the present embodiment includes the third thermal conductive layer 530, so the battery cell 110 positioned on the innermost side may efficiently radiate heat, and the deviation of temperatures among the battery cells 110 of the battery cell stack 120 may be minimized.

The deviation of temperatures among the portions of the battery cell 110 or the deviation of temperatures among the battery cells 110 in the battery cell stack 120 becomes a factor in the performance deterioration of the battery module, so the first to third thermal conductive layers 510, 520, and 530 according to the present embodiment may do much to provide constant performance and an increase of the lifespan of the battery module.

A thermal resin layer according to an exemplary embodiment of the present invention will now be described in detail with reference to FIG. 2, FIG. 3, and FIG. 5.

FIG. 5 is a perspective view of a U-shaped frame and a heat sink included in the battery module of FIG. 2.

As illustrated in FIG. 2, FIG. 3, and FIG. 5, the battery module 100 according to the present embodiment may further include a thermal resin layer 600 positioned between the battery cell stack 120 and the bottom part 210a of the housing 200. The thermal resin layer 600 may include a first thermal resin layer 610 and a second thermal resin layer 620 spaced from each other, and the first thermal resin layer 610 and the second thermal resin layer 620 may be positioned on the ends of the bottom part 210a in the protruding direction of the electrode leads 111 and 112, respectively, of the battery cell 110.

The thermal resin layer 600 may be formed by applying a thermal resin to the bottom part 210a before the battery cell stack 120 is received in the housing 200, and curing the applied thermal resin.

The battery cell stack 120 may move in the direction (z-axis direction) that is perpendicular to the bottom part 210a of the housing 200 and may be mounted on the bottom part 210a of the housing 200 when the thermal resin is applied and is not yet cured. The thermal resin layer 600 formed after the thermal resin is cured may be positioned between the bottom part 210a of the housing 200 and the battery cell stack 120.

The thermal resin may include a thermal conductive adhesive material, and in further detail, may include at least one of a silicone material, a urethane material, and an acrylic material. The thermal resin is a liquid when applied, and is cured after being applied, and it may fix at least one battery cell 110 configuring the battery cell stack 120. The thermal resin has an excellent thermal conductive characteristic, and it may quickly transfer the heat generated by the battery cell 110 to the lower side of the battery module to prevent the battery module from overheating. In other words, the heat generated by the battery cell 110 may be discharged to the outside of the battery module 100 through the thermal resin layer 600, the bottom part 210a, and a heat sink 300 to be described.

As described above, the portion that is near the electrode leads 111 and 112 from among the battery cells 110 generates much heat, the thermal resin layer is not formed on the entire bottom part 210a of the housing 200, but the first thermal resin layer 610 and the second thermal resin layer 620 are formed on the portion generating much heat, thereby reducing the use of a raw material and increasing cooling and heat-radiating performance. Although not shown in detail, an insulation film may be disposed on the bottom part 210a between the first thermal resin layer 610 and the second thermal resin layer 620.

A structure of the heat sink according to an embodiment of the present invention will now be described with reference to FIG. 5 and FIG. 6.

FIG. 6 is a top plan view of a battery module of FIG. 1 in a z-axis direction on an xy-plane.

As illustrated in FIG. 2, FIG. 5 and FIG. 6, the battery module 100 according to the present embodiment may include a heat sink 300 positioned below the bottom part 210a of the housing 200, and the bottom part 210a may configure an upper plate of the heat sink 300. The heat sink 300 and the bottom part 210a of the housing 200 may form a flow path of a coolant.

The heat sink 300 may include a lower plate 310 forming a frame of the heat sink 300 and bonded to the bottom part 210a of the housing 200 by welding, and a denting portion 340 that is a path for the coolant to flow.

The denting portion 340 of the heat sink 300 corresponds to a portion formed when the lower plate 310 is dented in a downward direction. A cross-section of the denting portion 340 with respect to an xz-plane that is perpendicular to the direction in which the flow path of a coolant extends may be a U-shaped duct, and the bottom part 210a may be positioned in an open upper side of the U-shaped duct. As the heat sink 300 contacts the bottom part 210a, a space between the denting portion 340 and the bottom part 210a becomes a region through which the coolant flows, that is, the flow path of the coolant. Hence, the bottom part 210a of the housing 200 may contact the coolant.

There is no specific limit in the method for manufacturing a denting portion 340 of a heat sink 300, and the U-shaped denting portion 340 with the open upper side may be formed by providing a denting structure for the plate-shaped heat sink 300.

The battery module 100 according to the present embodiment may further increase the cooling performance through a cooling integrated structure of the housing 200 and the heat sink 300. The cooling integrated structure may be achieved when the bottom part 210a of the housing 200 acts as the upper plate of the heat sink 300. The cooling efficiency caused by direct cooling increases, and the heat sink 300 is integrated with the bottom part 210a of the housing 200, thereby increasing a space use rate of the battery module 100 and the battery pack 1000 in which the battery module 100 is installed.

In detail, the heat generated by the battery cell 110 may pass through the thermal resin layer 600, the bottom part 210a of the housing 200, and the coolant, and may be transmitted to the outside of the battery module 100. By removing the unneeded cooling structure, the heat transfer path is simplified, and air gaps among respective layers may be reduced, thereby increasing the cooling efficiency or performance. Particularly, as the bottom part 210a is configured to be the upper plate of the heat sink 300, the bottom part 210*a* contacts the coolant, and further direct cooling is available through the coolant as a merit.

By removing the unneeded cooling structure, a height of the battery module 100 is reduced, thereby reducing a cost and increasing spatial utility. The battery module 100 is compactly disposed, thereby increasing the capacity or the output of the battery pack 1000 including battery modules 100.

The bottom part 210*a* of the housing 200 may be bonded to the lower plate 310 of the heat sink 300 in which the denting portion 340 is not formed by welding. According to the cooling integrated structure of the bottom part 210*a* of the housing 200 and the heat sink 300, the present embodiment may support a load of the battery cell stack 120 received in the housing 200 and reinforce rigidity of the battery module 100 in addition to the above-described increase in cooling performance. The lower plate 310 and the bottom part 210*a* of the housing 200 are sealed by welding combination, so the coolant may flow without leakage in the denting portion 340 formed in the lower plate 310.

For efficient cooling, it is preferable for the denting portion 340 to be formed in the entire region that corresponds to the bottom part 210*a* of the housing 200 as illustrated in FIGS. 5 and 6. For this purpose, the denting portion 340 may be bent at least once and may extend from one side to another side. Particularly, it is desirable for the denting portion 340 to be bent multiple times so that the denting portion 340 may be formed in the entire region that corresponds to the bottom part 210*a* of the housing 200. As the coolant moves to from the beginning to the end of the coolant flow path formed in the entire region that corresponds to the bottom part 210*a* of the housing 200, the entire region of the battery cell stack 120 may be efficiently cooled.

The coolant is a cooling medium, it has no specific limits, and it may be cooling water.

The heat sink 300 according to the present embodiment may include an inlet 320 for inflow of the coolant and an outlet 330 for discharging the coolant. When the denting portion 340 of the heat sink 300 extends from one side to another side, the inlet 320 may be provided on one side of a lower surface of the denting portion 340, and the outlet 330 may be provided on another side of a lower surface of the denting portion 340. The coolant is first input between the bottom part 210*a* and the denting portion 340 through the inlet 320 from a pack coolant supplying duct to be described, and the input coolant may move along the denting portion 340 and may be discharged to the pack coolant discharging duct through the outlet 330. As the coolant moves from one side to another side of the denting portion 340 formed in the entire region of the bottom part 210*a*, the entire region of the battery cell stack 120 may be efficiently cooled.

A cell barrier 350 may be formed in the denting portion 340 of the heat sink 300 according to the present embodiment. In detail, the cell barrier 350 protrudes in an opposite direction to the direction in which the denting portion 340 is dented, and it may extend along the denting portion 340. In a large-area battery module that has a greater number of battery cells, compared to the prior art, that are stacked in a similar way to the battery cell stack 120 according to the present embodiment, a width of the coolant flow path and the temperature devision may increase. In comparison to the conventional case in which about 12 to 24 battery cells are stacked in one battery module, about 32 to 48 battery cells 110 are stacked in one large-area battery module. In this case, the cell barrier 350 according to the present embodiment may reduce the width of the cooling flow path to minimize a pressure drop and simultaneously reduce a temperature deviation between the coolant flow paths. Therefore, the uniform cooling effect may be realized.

A mounting structure of the heat sink will now be described with reference to FIG. 7.

FIG. 7 is a cross-sectional view along a line B-B' of FIG. 6. For ease of description, FIG. 7 additionally illustrates a pack coolant supplying duct and a frame positioned below the battery module.

As illustrated in FIG. 2, FIG. 5, and FIG. 7, the housing 200 according to the present embodiment includes a first housing protrusion 211*a* and a second housing protrusion 211*b* so that part of the bottom part 210*a* of the housing 200 may protrude and pass through the end plate 400, and the first housing protrusion 211*a* is spaced from the second housing protrusion 211*b*. The first housing protrusion 211*a* and the second housing protrusion 211*b* may be positioned on respective ends of one corner of the bottom part 210*a*.

The heat sink 300 may include a first heat sink protrusion 311*a* and a second heat sink protrusion 311*b* protruding to portions on which the first housing protrusion 211*a* and the second housing protrusion 211*b* are positioned from one side of the heat sink 300.

A housing mounting hole 211H may be formed on the first housing protrusion 211*a* and the second housing protrusion 211*b*, and a heat sink mounting hole 311H may be formed on the first heat sink protrusion 311*a* and the second heat sink protrusion 311*b*.

Numbers of the housing mounting holes 211H and the heat sink mounting holes 311H have no specific limits, it is preferable for the number of the housing mounting holes 211H and the number of the heat sink mounting holes 311H to be the same as each other, and it is further preferable for the housing mounting holes 211H and the heat sink mounting holes 311H to be positioned to correspond to each other.

As illustrated in FIG. 7, the battery module 100 may be mounted on the frame 1100 to configure a battery pack. A pack coolant supplying duct 1200 may be positioned between the battery module 100 and the frame 1100.

The pack coolant supplying duct 1200 supplies the coolant to the battery module, and a coolant supplying opening 1210 may be formed. The inlet 320 of the heat sink 300 may be positioned to correspond to the coolant supplying opening 1210 and may be connected to the same. Accordingly, the coolant moving along the pack coolant supplying duct 1200 may be input between the heat sink 300 and the bottom part 210*a* through the coolant supplying opening 1210 and the inlet 320.

Although not shown in detail, a pack coolant discharging duct (not shown) in which a coolant discharging opening (not shown) is formed may be positioned between the battery module 100 and the frame 1100. The outlet 330 of the heat sink 300 may be positioned to correspond to the coolant discharging opening and may be connected to the same. The coolant having moved along the denting portion 340 may be discharged to the pack coolant discharging duct through the outlet 330 and the coolant discharging opening.

A fastening hole 1110 corresponding to the housing mounting hole 211H and the heat sink mounting hole 311H may be formed in the frame 1100, and a mounting bolt 1120 may pass through the housing mounting hole 211H and the heat sink mounting hole 311H and may be combined to the fastening hole 1110. The pack coolant supplying duct 1200 may be designed to escape from the mounting bolt 1120 and pass through on the frame 1100.

The housing 200 and the heat sink 300 may be fixed to the frame 1100 through the mounting bolt 1120. By a fastening force of the mounting bolt 1120, the bottom part 210a, the heat sink 300, and the pack coolant supplying duct 1200 are tightly and closely attached to each other, so a sealing property is increased to reduce a possibility of leakage of the coolant. Particularly, the inlet 320 and the outlet 330 may be positioned near the first heat sink protrusion 311a and the second heat sink protrusion 311b, thereby efficiently blocking the leakage of the coolant from the inlet 320 and the outlet 330.

At least one of the inlet 320 and the outlet 330 may include a sealing member 321 surrounding its exterior circumference. The sealing member 321 may be positioned below the heat sink 300, and in detail, it may be positioned between the heat sink 300 and the pack coolant supplying duct 1200. The coolant may be prevented from leaking when the coolant is input and discharged through the sealing member 321. A structure of the sealing member 321 according to the present embodiment has no limits, but may be a member in a gasket shape or a valve port member.

Terms representing directions such as before, after, right, left, top, and bottom have been used, but they are for ease of description, and are variable depending on a position of a target material or a position of an observer.

The above-described one or more battery modules according to the present embodiment may be installed together with various controlling and protecting systems such as a battery management system (BMS) or a cooling system and may configure a battery pack.

The battery module or the battery pack is applicable to various types of devices. In detail, these devices may be applied to a transportation apparatus such as an electric bicycle, an electric vehicle, a hybrid vehicle, and the like, but are not limited thereto, and may be applied to various devices that can use the secondary battery.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A battery module comprising:

a battery cell stack comprising a plurality of battery cells;

a housing comprising the battery cell stack; and a thermal conductive layer on the battery cell stack, wherein the thermal conductive layer includes a first thermal conductive layer and a second thermal conductive layer at respective ends of an upper side of the battery cell stack in a protruding direction of electrode leads of the battery cell, wherein the first thermal conductive layer and the second thermal conductive layer are physically separate from each other and are spaced apart by a gap on the upper side of the battery cell stack, wherein the first thermal conductive layer and the second thermal conductive layer extend in a direction in which the battery cells are stacked.

2. The battery module of claim 1, wherein:

the first thermal conductive layer and the second thermal conductive layer are connected in a direction in which the plurality of battery cells are stacked.

3. The battery module of claim 1, wherein:

the thermal conductive layer further comprises a third thermal conductive layer between the first thermal conductive layer and the second thermal conductive layer.

4. The battery module of claim 3, wherein:

the third thermal conductive layer is connected to the first thermal conductive layer and the second thermal conductive layer.

5. The battery module of claim 3, wherein:

the third thermal conductive layer is connected to one side of a battery cell stack, and the third thermal layer is in a direction parallel to the plurality of battery cells.

6. The battery module of claim 5, wherein:

the third thermal conductive layer is spaced apart from an outermost battery cell of the battery cell stack.

7. The battery module of claim 1, further comprising:

a thermal resin layer between the battery cell stack and a bottom part of the housing.

8. The battery module of claim 7, wherein:

the thermal resin layer includes a first thermal resin layer spaced apart from a second thermal resin layer, and the first thermal resin layer and the second thermal resin layer are at respective ends of the bottom part in the protruding direction of electrode leads of the battery cell.

9. The battery module of claim 1, further comprising:

a heat sink below a bottom part of the housing, wherein the bottom part of the housing forms an upper plate of the heat sink.

10. The battery module of claim 9, wherein:

the heat sink and the bottom part of the housing form a coolant flow path, and the bottom part of the housing contacts the coolant.

11. A battery pack comprising the battery module of claim 1.

* * * * *